(12) United States Patent  
Wang et al.

(10) Patent No.: US 11,711,870 B2  
(45) Date of Patent: Jul. 25, 2023

(54) COMMUNICATION METHOD, APPARATUS, AND SYSTEM, STORAGE MEDIUM, AND TERMINAL

(71) Applicant: SAVANT TECHNOLOGIES LLC, East Cleveland, OH (US)

(72) Inventors: Yiming Wang, Shanghai (CN); Xin Luo, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 17/221,887

(22) Filed: Apr. 5, 2021

(65) Prior Publication Data

US 2021/0352765 A1 Nov. 11, 2021

(30) Foreign Application Priority Data

Apr. 3, 2020 (CN) .......................... 202010261003.6

(51) Int. Cl.
| | |
|---|---|
| *H04W 4/00* | (2018.01) |
| *H04W 84/18* | (2009.01) |
| *H04W 4/02* | (2018.01) |
| *H04B 7/155* | (2006.01) |

(Continued)

(52) U.S. Cl.
CPC ........ *H04W 84/18* (2013.01); *H04B 7/15507* (2013.01); *H04B 17/318* (2015.01); *H04W 4/023* (2013.01); *H04W 24/02* (2013.01)

(58) Field of Classification Search
CPC ..... H04W 84/18; H04W 4/023; H04W 24/02; H04W 4/80; H04W 88/06; H04B 7/15507; H04B 17/318
See application file for complete search history.

(56) References Cited

U.S. PATENT DOCUMENTS

2020/0274728 A1* 8/2020 Stuart-Muirk ...... H04L 12/2838
2020/0396783 A1* 12/2020 Hwang ................. H04W 76/30

FOREIGN PATENT DOCUMENTS

WO 2019/055468 A1 3/2019

OTHER PUBLICATIONS

Netherlands Search Report from NL Appl. No. 2027884, dated Nov. 16, 2021.

* cited by examiner

*Primary Examiner* — Erika A Washington
(74) *Attorney, Agent, or Firm* — Wood IP LLC (57) ABSTRACT

The application relates to a communication method, apparatus, and system, a storage medium, and a terminal. The method includes: receiving first data from a first receiving device in multiple first devices of a first device type through a first network of a first network type, wherein the first data is received from a first client device by the first receiving device through a second network of a second network type, the first data is configured to control a first target device in multiple second devices of a second device type, and the first client device is beyond a communication range of the second devices; and sending the first data to a relay device in the second devices through a third network of a second network type, wherein the relay device is connected to the first target device through a fourth network of a third network type, and the first data is sent to the first target device by the relay device. The technical solution of the application allows a communication connection to be established between different types of Bluetooth network devices without updating an old type of network devices.

16 Claims, 7 Drawing Sheets

(51) Int. Cl.
*H04B 17/318* (2015.01)
*H04W 24/02* (2009.01)

COMMUNICATION METHOD, APPARATUS, AND SYSTEM, STORAGE MEDIUM, AND TERMINAL

TECHNICAL FIELD

The application relates to the field of Bluetooth communication. Specifically, the application relates to a communication method, apparatus, and system, a storage medium, and a terminal.

BACKGROUND

Existing different types of wireless networks, such as different types of Bluetooth networks, may be incompatible. For example, Bluetooth Low Energy (BLE) networks include a standard Special Interest Group (SIG) mesh and a private mesh. Devices in a Bluetooth network with two network protocols cannot communicate with each other.

Devices that currently use a SIG network protocol are compatible with each other, but are not compatible with devices that use previous generation networks, such as a private network protocol. To achieve the compatibility of the devices of the two networks, the devices in the private mesh need to be upgraded, for example, new functions that need to be implemented are upgraded. However, limited to chips and other cost issues required for the upgrade, it may not be possible to upgrade all the devices to devices compatible with the SIG network protocol, or the cost is too high, and it cannot be ensured that the devices are upgraded in a timely manner. In addition, after upgrading the devices, corresponding APPs also need to be upgraded, so such a solution requires a high cost.

SUMMARY

Embodiments of the application provide a communication method, apparatus, and system, a storage medium, and a terminal, so as to at least solve the problem that it is difficult to establish a connection between different types of networks in the conventional art.

According to an aspect of the embodiments of the application, a communication method is provided. The method may include that: first data is received from a first receiving device in multiple first devices of a first device type through a first network of a first network type, the first data being received from a first client device by the first receiving device through a second network of a second network type, the first data being configured to control a first target device in multiple second devices of a second device type, and the first client device being beyond a communication range of the second devices; and the first data is sent to a relay device in the second devices through a third network of a second network type, the relay device being connected to the first target device through a fourth network of a third network type, and the first data being sent to the first target device by the relay device.

In this way, a first client device not within a communication range of a second network of a second network type may send data to devices in the second network by establishing a connection through a first network of a first network type, and send, for example, control instructions to the devices in the second network. Devices in the first network of the first network type can send data to the devices in the second network of the second network type.

The method according to an exemplary embodiment of the application may further include that: second data is received from the relay device through the third network of the second network type, the second data being configured to control a second target device in the first devices.

In this way, the devices in the first network of the first network type can receive data from the devices in the second network of the second type. The devices in the first network can be controlled according to the received data.

The method according to an exemplary embodiment of the application may further include that: the second data is sent to the second target device through the first network of the first network type.

In this way, the devices in the first network can send data to other devices in the first network, so that the other devices receive the data or are controlled. For example, if other devices are beyond a communication range of the devices in the second network or the communication quality is poor, the data may be acquired by communicating with devices with high communication quality in the first network.

In the method according to an exemplary embodiment of the application, the second data is received from a second client device by a second receiving device in the second devices through a fifth network of a second network type, the second client device is beyond a communication range of the first devices, and the second data is sent from the second receiving device to the relay device.

In this way, a second client device beyond the communication range of the devices in the first network can transmit data to the devices in the first network through the devices in the second network.

The method according to an exemplary embodiment of the application may further include that: a second device having the best signal strength with the first device in the second devices is detected as the relay device.

In this way, the communication quality between two networks is improved.

In the method according to an exemplary embodiment of the application, the first network type is a SIG mesh; the first device is a SIG network device; the second network type is a Generic Attribute Profile (GATT) mesh; the third network type is a private mesh; and the second device is a private network device.

In this way, communication between the SIG network device and the private network device is achieved, and there is no need to upgrade the private network device.

According to another aspect of the embodiments of the application, a communication apparatus is also provided. The apparatus may include: a first network type receiving module, configured to receive first data from a first receiving device in multiple first devices of a first device type through a first network of a first network type, the first data being received from a first client device by the first receiving device through a second network of a second network type, the first data being configured to control a first target device in multiple second devices of a second device type, and the first client device being beyond a communication range of the second devices; and a second network type sending module, configured to send the first data to a relay device in the second devices through a third network of a second network type, the relay device being connected to the first target device through a fourth network of a third network type, and the first data being sent to the first target device by the relay device.

In this way, a first client device not within a communication range of a second network of a second network type may send data to devices in the second network by establishing a connection through a first network of a first network type, and send, for example, control instructions to the devices in the second network. Devices in the first network of the first network type can send data to the devices in the second network of the second network type.

The apparatus according to an exemplary embodiment of the application may further include: a second network type receiving module, configured to receive second data from the relay device through the third network of a second network type, the second data being configured to control a second target device in the first devices.

In this way, the devices in the first network of the first network type can receive data from the devices in the second network of the second type. The devices in the first network can be controlled according to the received data.

The apparatus according to an exemplary embodiment of the application may further include: a first network type sending module, configured to send the second data to the second target device through the first network of a first network type.

In this way, the devices in the first network can send data to other devices in the first network, so that the other devices receive the data or are controlled. For example, if other devices are beyond a communication range of the devices in the second network or the communication quality is poor, the data may be acquired by communicating with devices with high communication quality in the first network.

In the apparatus according to an exemplary embodiment of the application, the second data is received from a second client device by a second receiving device in the second devices through a fifth network of a second network type, the second client device is beyond a communication range of the first devices, and the second data is sent from the second receiving device to the relay device.

In this way, a second client device beyond the communication range of the devices in the first network can transmit data to the devices in the first network through the devices in the second network.

The apparatus according to an exemplary embodiment of the application may further include: a signal detection module, configured to detect a second device having the best signal strength with the first device in the second devices as the relay device.

In this way, the communication quality between two networks is improved.

The apparatus according to an exemplary embodiment of the application may be a first device in the multiple first devices.

In this way, the devices in the first network have the ability to communicate with the devices in the second network without the need to upgrade the devices in the second network.

According to another aspect of the embodiments of the application, a communication system is also provided. The system may include: multiple first devices, each including: a first network type receiving module, configured to receive first data from a first receiving device in multiple first devices of a first device type through a first network of a first network type, the first data being received from a first client device by the first receiving device through a second network of a second network type, the first data being configured to control a first target device in multiple second devices of a second device type, and the first client device being beyond a communication range of the second devices; and a second network type sending module, configured to send the first data to a relay device in the second devices through a third network of a second network type, the relay device being connected to the first target device through a fourth network of a third network type, and the first data being sent to the first target device by the relay device; and the multiple second devices.

In this way, a first client device not within a communication range of a second network of a second network type may send data to devices in the second network by establishing a connection through a first network of a first network type, and send, for example, control instructions to the devices in the second network. Devices in the first network of the first network type can send data to the devices in the second network of the second network type.

According to another aspect of the embodiments of the application, a storage medium is also provided, which may include a stored program. When the program is run, a device where the storage medium is located is controlled to perform the method according to any one of the above.

In this way, a first client device not within a communication range of a second network of a second network type may send data to devices in the second network by establishing a connection through a first network of a first network type, and send, for example, control instructions to the devices in the second network. Devices in the first network of the first network type can send data to the devices in the second network of the second network type.

According to another aspect of the embodiments of the application, a terminal is also provided. The terminal may include one or more processors, a memory, and one or more programs. The one or more programs are stored in the memory, and configured to be executed by the one or more processors. The one or more programs are configured to perform the method according to any one of the above.

In this way, a first client device not within a communication range of a second network of a second network type may send data to devices in the second network by establishing a connection through a first network of a first network type, and send, for example, control instructions to the devices in the second network. Devices in the first network of the first network type can send data to the devices in the second network of the second network type.

In the embodiments of the application, a technical solution is provided in which a device in one type of network receives data from a client and transmits the data to a device in another type of network, so as to at least solve the technical problem of incompatibility between different types of networks, thereby achieving the technical effects of communicating between different types of incompatible networks and saving the cost required for establishing communication between incompatible networks.

BRIEF DESCRIPTION OF THE DRAWINGS

The accompanying drawings described herein are used to provide a further understanding of the application, and constitute a part of the application, and the exemplary embodiments of the application and the description thereof are used to explain the application, but do not constitute improper limitations to the application. In the drawings.

DRAWING REFERENCE NUMERALS

10: First client device;
100: First network;
101: First receiving device;
103: First device;
105: Second target device;
20: Second client device;
200: Fourth network;
201: First target device;
203: Relay device;
205: Second receiving device;
301: Second network;
303: Third network;
305: Fifth network;
40: Apparatus;
401: First network type receiving module;
403: Second network type sending module;
405: Second network type receiving module;
407: First network type sending module;
409: Signal detection module;
501, 503: SIG network device;
S101, S103: Step;
S201, S203: Step.

DETAILED DESCRIPTION OF THE EMBODIMENTS

In order to make those skilled in the art better understand the solutions of the application, the technical solutions in the embodiments of the application will be clearly and completely described below with reference to the drawings in the embodiments of the application. It is apparent that the described embodiments are only a part of the embodiments of the application, not all of the embodiments. All other embodiments obtained by those of ordinary skill in the art based on the embodiments of the application without creative efforts should fall within the scope of protection of the application.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the application described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or modules or units to clearly list those steps or modules or units, and other steps or modules or units which are not clearly listed or are inherent to these processes, methods, products or devices may be included instead.

Figure 1:
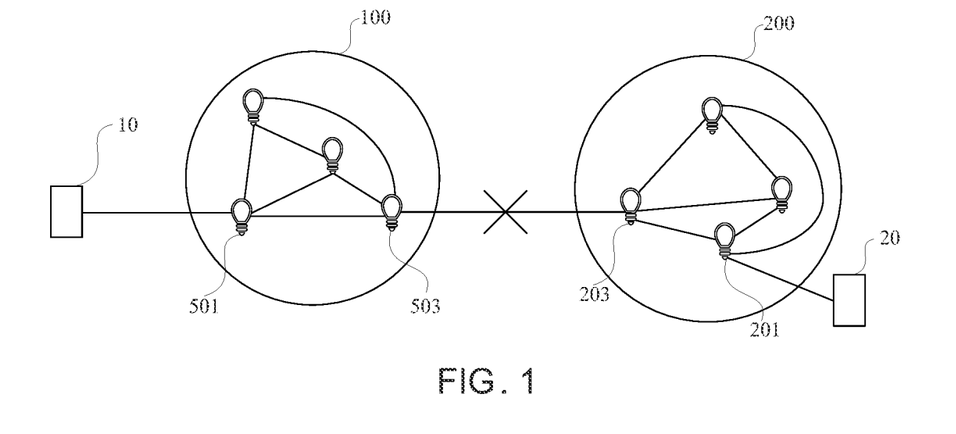
FIG. 1 is a schematic diagram of two different types of network communication.

Existing different types of wireless networks, such as different types of BLE Bluetooth networks, may be incompatible. FIG. 1 is a schematic diagram of two different types of network communication. For example, a network 100 is a SIG mesh and includes multiple SIG network devices (devices 501, 503). A network 200 is a private mesh and includes multiple private network devices (devices 201, 203). A first client device 10 can communicate with the SIG network device through a GATT mesh, and a second client device can communicate with the private network device through the GATT mesh. For example, a client device may send a control command to a device. There is no direct communication between the network 100 and the network 200.

In order to realize the communication between the network 100 and the network 200, a proxy node needs to be set in each network. The proxy node is connected to the client through an APP, and receives commands through the APP or sends the status of a network device to the APP. However, due to the limitation of a data transmission distance of a BLE network, it cannot be ensured that the client is connected to the proxy nodes in each network simultaneously, and the devices in the two networks cannot be controlled simultaneously.

Figure 2:
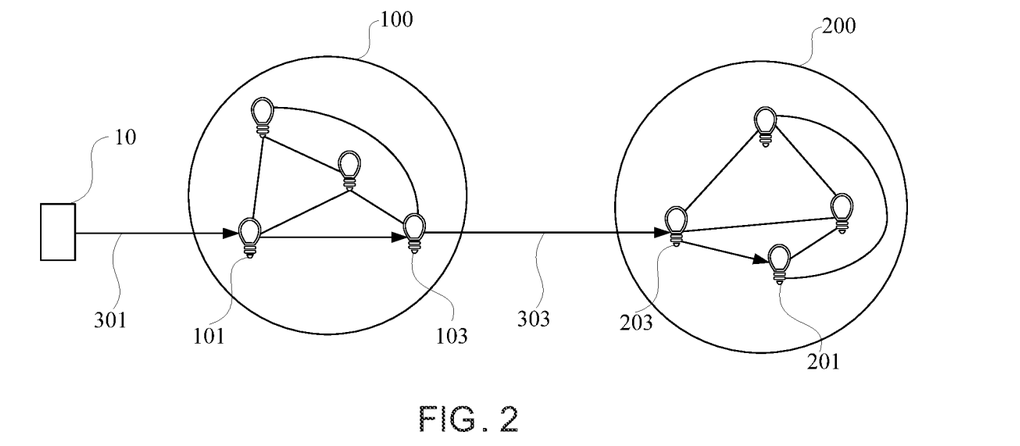
FIG. 2 is a schematic diagram of two different types of network communication according to an embodiment of the application.
Figure 3:
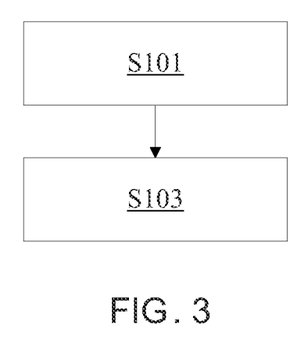
FIG. 3 is a flowchart of a communication method according to an embodiment of the application.

According to an embodiment of the application, a communication method is provided. FIG. 2 is a schematic diagram of two different types of network communication according to an embodiment of the application. Accordingly, FIG. 3 is a flowchart of a communication method according to an embodiment of the application. Referring to FIG. 2 and FIG. 3, a communication method according to an embodiment of the application includes steps S101 and S103.

In step S101, first data is received from a first receiving device 101 in multiple first devices of a first device type through a first network 100 of a first network type. The first data is received from a first client device 10 by the first receiving device 101 through a second network 301 of a second network type, the first data is configured to control a first target device 201 in multiple second devices of a second device type, and the first client device 10 is beyond a communication range of the second devices.

In step S103, the first data is sent to a relay device 203 in the second devices through a third network 303 of a second network type. The relay device 203 is connected to the first target device through a fourth network 200 of a third network type, and the first data is sent to the first target device 201 by the relay device 203.

In this way, a first client device 10 not within a communication range of a fourth network 200 of a third network type may send data to devices in the fourth network 200 by establishing a connection through a first network 100 of a first network type, and send, for example, control instructions to the devices in the fourth network 200. Devices in the first network 100 of the first network type can send data to the devices in the fourth network 200 of the third network type.

The communication method shown in FIG. 3 may be performed in a first device in multiple first devices. For example, as shown in FIG. 2, the first device 103 performs the method according to FIG. 3. It should be understood that FIG. 2 only schematically illustrates the first device 103 and the first receiving device 101 in the multiple first devices. The first device 103 and the first receiving device 101 can be selected from the multiple first devices according to communication requirements (for example, considering communication quality).

Figure 4:
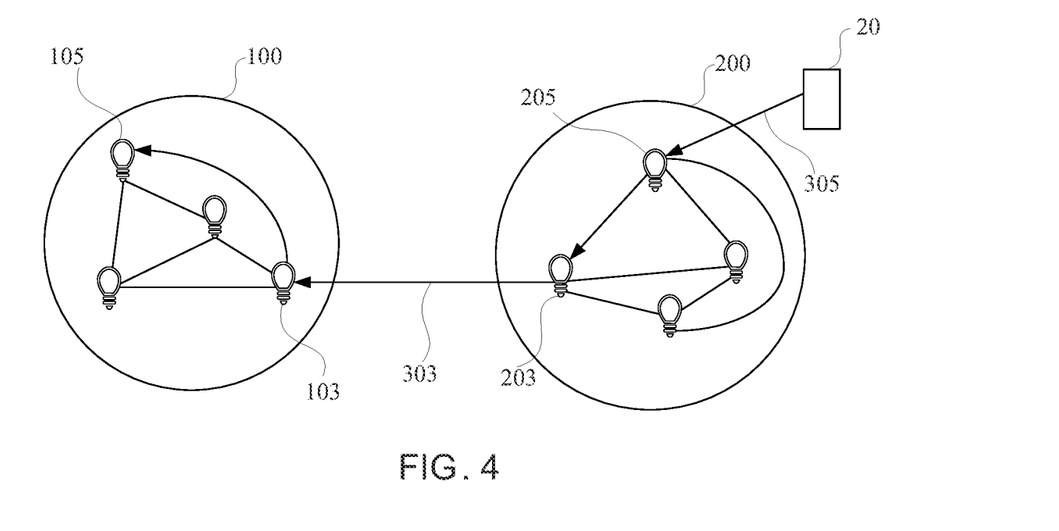
FIG. 4 is a schematic diagram of two different types of network communication according to an exemplary implementation manner of the application.
Figure 5:
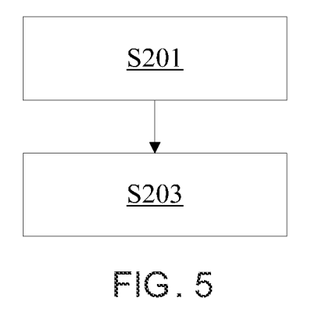
FIG. 5 is a flowchart of a communication method according to an exemplary implementation manner of the application.

FIG. 4 is a schematic diagram of two different types of network communication according to an exemplary implementation manner of the application. FIG. 5 is a flowchart of a communication method according to an exemplary implementation manner of the application. Referring to FIG. 4 and FIG. 5, the method according to an exemplary embodiment of the application further includes that: second data is received from the relay device 203 through the third network 303 of the second network type, the second data being configured to control a second target device 105 in the first devices.

In this way, the devices in the first network 100 of the first network type can receive data from the devices in the fourth network 200 of the third network type. The devices in the first network 100 can be controlled according to the received data.

Referring to FIG. 4, the method according to an exemplary embodiment of the application further includes that: the second data is sent to the second target device 105 through the first network 100 of the first network type.

In this way, the devices in the first network 100 can send data to other devices in the first network 100, so that the other devices receive the data or are controlled. For example, if other devices are beyond a communication range of the devices in the fourth network 200 or the communication quality is poor, the data may be acquired by communicating with devices with high communication quality in the first network 100.

Referring to FIG. 4, in the method according to an exemplary embodiment of the application, the second data is received from a second client device 20 by a second receiving device 205 in the second devices through a fifth network 305 of the second network type, the second client device 20 is beyond a communication range of the first devices, and the second data is sent from the second receiving device 205 to the relay device 203.

In this way, the second client device 20 beyond the communication range of the devices in the first network 100 can transmit data to the devices in the first network 100 through the devices in the fourth network 200.

The method according to an exemplary embodiment of the application further includes that: a second device having the best signal strength with the first device in the second devices is detected as the relay device 203. Therefore, the communication quality between two networks is ensured.

In the method according to an exemplary embodiment of the application, the first network type is a SIG mesh; the first device is a SIG network device; the second network type is a GATT mesh; the third network type is a private mesh; and the second device is a private network device.

For example, a SIG network device receives first data from another SIG network device in multiple SIG network devices through the SIG mesh. The first data is received by the another SIG network device from the first client device 10 through the GATT mesh. The first data is configured to control a target private network device in the multiple private network devices. The first client device 10 is beyond a communication range of the private network device. The SIG network device sends the first data to a relay private network device in the private network devices through the GATT mesh. The relay private network device is connected to the target private network device through the private mesh. The first data is sent to the target private network device by the relay private network device. Therefore, the first client device 10 that cannot directly communicate with the private network device can send data, such as a control instruction, to the private mesh through the SIG mesh, thereby controlling the target private network device. The SIG network device may send the first data to a private network sending device in a "read and write" manner, thereby controlling the private network device.

The second client device 20 is beyond a communication range of the SIG network device. The second client device 20 may transmit data to the SIG network device through the private mesh. For example, the second client device 20 transmits second data to one of the private network devices through the GATT mesh. The second data is then transmitted to the relay private network device through the private mesh, transmitted to a SIG network device through the GATT mesh, and transmitted by the SIG network device to the target SIG network device through the SIG mesh, so that the target SIG network device is controlled in response to the second data. The private network device may send the second data to the SIG network device in a "notify" manner.

Figure 6:
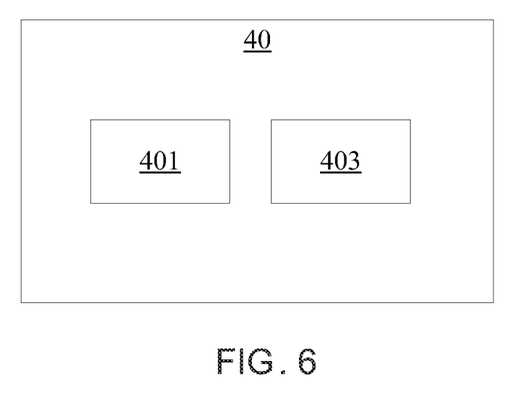
FIG. 6 is a block diagram of a communication apparatus according to an embodiment of the application.

According to an embodiment of the application, a communication apparatus is provided. FIG. 6 is a block diagram of a communication apparatus according to an embodiment of the application. Referring to FIG. 6 and FIG. 2, a communication apparatus 40 according to an embodiment of the application includes a first network type receiving module 401 and a second network type sending module 403. The first network type receiving module 401 is configured to receive first data from a first receiving device 101 in multiple first devices of a first device type through a first network 100 of a first network type. The first data is received from a first client device 10 by the first receiving device 101 through a second network 301 of a second network type, the first data is configured to control a first target device 201 in multiple second devices of a second device type, and the first client device 10 is beyond a communication range of the second devices. The second network type sending module 403 is configured to send the first data to a relay device 203 in the second devices through a third network 303 of a second network type. The relay device 203 is connected to the first target device 201 through a fourth network 200 of a third network type, and the first data is sent to the first target device 201 by the relay device 203.

Figure 7:
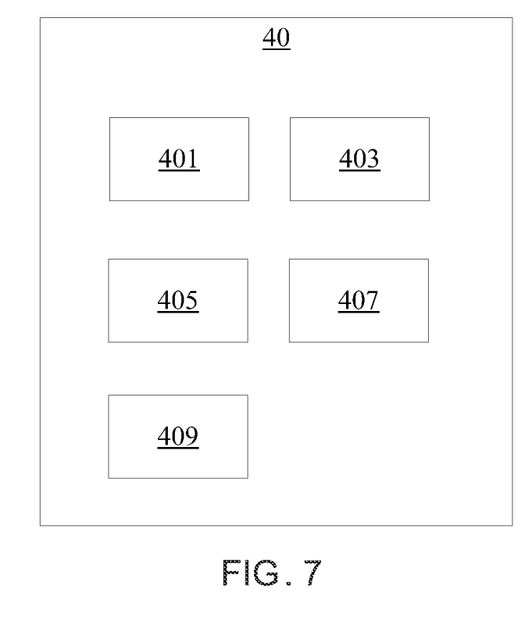
FIG. 7 is a block diagram of a communication apparatus according to an exemplary implementation manner of the application.

FIG. 7 is a block diagram of a communication apparatus according to an exemplary implementation manner of the application. Referring to FIG. 7 and FIG. 4, the apparatus 40 according to an embodiment of the application further includes a second network type receiving module 405. The second network type receiving module 405 is configured to receive second data from the relay device 203 through the third network 303 of a second network type. The second data is configured to control a second target device 105 in the first devices.

Referring to FIG. 7 and FIG. 4, the apparatus 40 according to an embodiment of the application further includes a first network type sending module 407. The first network type sending module 407 is configured to send the second data to the second target device 105 through the first network 100 of a first network type.

Referring to FIG. 7 and FIG. 4, the second data is received from a second client device 20 by a second receiving device 205 in the second devices through a fifth network 305 of a second network type, the second client device 20 is beyond a communication range of the first devices, and the second data is sent from the second receiving device 205 to the relay device 203.

Referring to FIG. 7 and FIG. 4, the apparatus 40 according to an exemplary embodiment of the application further includes: a signal detection module 409, configured to detect a second device having the best signal strength with the first device in the second devices as the relay device 203.

The apparatus 40 according to an exemplary embodiment of the application is a first device in the multiple first devices. The apparatus 40 according to an embodiment of the application performs the method according to an embodiment of the application as described above, and the descriptions are omitted herein.

According to an embodiment of the application, a communication system is provided. Referring to FIG. 2, a communication system according to an embodiment of the application includes multiple first devices and multiple second devices. Each first device includes a first network type receiving module 401 and a second network type sending module 403. The first network type receiving module 401 is configured to receive first data from a first receiving device 101 in multiple first devices of a first device type through a first network 100 of a first network type. The first data is received from a first client device 10 by the first receiving device 101 through a second network 301 of a second network type, the first data is configured to control a first target device 201 in multiple second devices of a second device type, and the first client device 10 is beyond a communication range of the second devices. The second network type sending module 403 is configured to send the first data to a relay device 203 in the second devices through a third network 303 of a second network type, the relay device 203 being connected to the first target device 201 through a fourth network 200 of a third network type, and the first data being sent to the first target device 201 by the relay device 203.

The first device in the system according to an embodiment of the application is the communication apparatus according to an embodiment of the application as described above. The apparatus performs the communication method according to an embodiment of the application as described above. The descriptions are omitted herein.

According to an embodiment of the application, a storage medium is provided, which includes a stored program. When the program is run, a device where the storage medium is located is controlled to perform the above method.

According to an embodiment of the application, a terminal is provided. The terminal includes one or more processors, a memory, and one or more programs. The one or more programs are stored in the memory, and configured to be executed by the one or more processors. The one or more programs are configured to perform the above method.

The technical solution of the application creates a BLE master device in a node of a SIG mesh and defines a new data transmission mode. Because GATT is a standard protocol, a BLE master device node may be connected to a proxy node in a private mesh through GATT, so it can be ensured that two different networks communicate with each other.

By adopting the technical solution of the application, the SIG mesh can be compatible with the private mesh without updating the firmware of an old private network node or connecting a client APP to multiple proxy nodes. Device manufacturers do not need to update the firmware of existing products and old private network nodes can be communicated with.

In the above embodiments of the application, descriptions of each embodiment are emphasized respectively, and parts which are not elaborated in detail in a certain embodiment may refer to relevant descriptions of other embodiments.

In several embodiments provided by the application, it is to be understood that the disclosed technical content may be implemented in other manners. The apparatus embodiments described above are merely illustrative. For example, the division of the unit or module is only a logical function division. In actual implementation, there may be another division manner, for example, multiple units or modules may be combined or integrated into another system, or some features may be ignored or not executed. In addition, the coupling or direct coupling or communication connection shown or discussed may be an indirect coupling or communication connection through some interfaces, modules or units, and may be electrical or otherwise.

The units or modules described as separate components may or may not be physically separated, and the members displayed as units or modules may or may not be physical units or modules, that is, may be located in one place, or may be distributed to multiple network units or modules. Some or all of the units or modules may be selected according to actual needs to achieve the purpose of the solution of the present embodiment.

In addition, each functional unit or module in each embodiment of the application may be integrated into a processing unit or module, each unit or module may also physically exist independently, and two or more than two units or modules may also be integrated into a unit or module. The integrated unit or module may be implemented in a hardware form and may also be implemented in the form of a software functional unit or module.

The integrated unit may be stored in a computer-readable storage medium if being implemented in the form of a software functional unit and sold or used as a standalone product. Based on such an understanding, the technical solution of the application, which is essential or contributes to the conventional art, may be embodied in the form of a software product. The computer software product is stored in a storage medium, including a number of instructions for causing a terminal device (which may be a personal computer, a server, or a network device, etc.) to perform all or part of the steps of the methods described in various embodiments of the application. The foregoing storage medium includes: a U disk, a Read-Only Memory (ROM), a Random Access Memory (RAM), a mobile hard disk, a magnetic disk, or an optical disk, and the like, which may store a program code.

The above is a preferred implementation of the application. It is to be noted that a number of modifications and refinements may be made by those of ordinary skill in the art without departing from the principles of the application, and such modifications and refinements are also considered to be within the scope of protection of the application.

What is claimed is:

1. A communication method, comprising:
    receiving first data from a first receiving device in a plurality of first devices of a first device type through a first network of a first network type, wherein the first data is received from a first client device by the first receiving device through a second network of a second network type, the first data is configured to control a first target device in a plurality of second devices of a second device type;
    sending the first data to a relay device in the plurality of second devices through a third network of the second network type, wherein the relay device is connected to the first target device through a fourth network of a third network type, and the first data is sent to the first target device by the relay device; and
    receiving second data from a second client device by a second receiving device in the plurality of second devices through a fifth network of the second network type, the second data being sent from the second receiving device to the relay device, the second client device being beyond a communication range of the plurality of first devices.

2. The method according to claim 1, further comprising: receiving the second data from the relay device through the third network of the second network type, wherein the second data is configured to control a second target device in the plurality of first devices.

3. The method according to claim 2, further comprising: sending the second data to the second target device through the first network of the first network type.

4. The method according to claim 1, wherein the first client device is beyond a communication range of the plurality of second devices.

5. The method according to claim 1, further comprising: detecting a second device having a best signal strength with a first device of the plurality of first devices in the plurality of second devices as the relay device.

6. The method according to claim 5, wherein
the first network type is a SIG mesh;
the first device is a SIG network device;
the second network type is a GATT mesh;
the third network type is a private mesh; and
the second device is a private network device.

7. A non-transitory storage medium, comprising a stored program, wherein when the stored program is run, a device where the non-transitory storage medium is located is controlled to perform the method according to claim 1.

8. A terminal, comprising: one or more processors, a memory, a display device, and one or more programs, wherein the one or more programs are stored in the memory, and configured to be run by the one or more processors, the one or more programs being configured to perform the method according to claim 1.

9. A communication apparatus, comprising:
a first network type receiving module, configured to receive first data from a first receiving device in a plurality of first devices of a first device type through a first network of a first network type, wherein the first data is received from a first client device by the first receiving device through a second network of a second network type, the first data is configured to control a first target device in a plurality of second devices of a second device type; and
a second network type sending module, configured to send the first data to a relay device in the plurality of second devices through a third network of the second network type, wherein the relay device is connected to the first target device through a fourth network of a third network type, and the first data is sent to the first target device by the relay device;
wherein (i) second data is received from a second client device by a second receiving device in the plurality of second devices through a fifth network of the second network type, (ii) the second data is sent from the second receiving device to the relay device; and
(iii) the second client device is beyond a communication range of the plurality of first devices.

10. The communication apparatus according to claim 9, further comprising:
a second network type receiving module, configured to receive the second data from the relay device through the third network of the second network type, wherein the second data is configured to control a second target device in the plurality of first devices.

11. The communication apparatus according to claim 10, further comprising:
a first network type sending module, configured to send the second data to the second target device through the first network of the first network type.

12. The communication apparatus according to claim 9, wherein the first client device is beyond a communication range of the plurality of second devices.

13. The communication apparatus according to claim 9, further comprising:
a signal detection module, configured to detect a second device having a best signal strength with a first device of the plurality of first devices in the plurality of second devices as the relay device.

14. The communication apparatus according to claim 9, wherein the communication apparatus is a first device in the plurality of first devices.

15. A communication system, comprising:
a plurality of first devices, each comprising:
a first network type receiving module, configured to receive first data from a first receiving device in the plurality of first devices of a first device type through a first network of a first network type, wherein the first data is received from a first client device by the first receiving device through a second network of a second network type, the first data is configured to control a first target device in a plurality of second devices of a second device type; and
a second network type sending module, configured to send the first data to a relay device in the plurality of second devices through a third network of the second network type, wherein the relay device is connected to the first target device through a fourth network of a third network type, and the first data is sent to the first target device by the relay device; and
the plurality of second devices;
wherein (i) second data is received from a second client device by a second receiving device in the plurality of second devices through a fifth network of the second network type, (ii) the second data is sent from the second receiving device to the relay device; and
(iii) the second client device is beyond a communication range of the plurality of first devices.

16. The communication system according to claim 15, wherein the first client device is beyond a communication range of the plurality second devices.

* * * * *